US008749848B2

(12) United States Patent
Morisse

(10) Patent No.: US 8,749,848 B2
(45) Date of Patent: Jun. 10, 2014

(54) METHODS AND APPARATUS FOR HALFTONING CONTINUOUS-TONE IMAGES

(75) Inventor: Peter Morisse, Bornem (BE)

(73) Assignee: ESKO Software BVBA, Ghent (BE)

( * ) Notice: Subject to any disclaimer, the term of this patent is extended or adjusted under 35 U.S.C. 154(b) by 128 days.

(21) Appl. No.: 13/367,705

(22) Filed: Feb. 7, 2012

(65) Prior Publication Data

US 2013/0201528 A1    Aug. 8, 2013

(51) Int. Cl.
*H04N 1/405* (2006.01)

(52) U.S. Cl.
USPC .................. 358/3.09; 358/3.14; 358/3.24

(58) Field of Classification Search
USPC ........ 358/1.9, 2.1, 3.02, 3.06–3.09, 3.14, 3.2, 358/3.24, 3.3
See application file for complete search history.

(56) References Cited

U.S. PATENT DOCUMENTS

| 5,892,588 A | 4/1999 | Samworth |
| 6,445,465 B1 | 9/2002 | Samworth |
| 8,132,508 B2 | 3/2012 | Samworth et al. |
| 2004/0130753 A1 | 7/2004 | Crounse |
| 2011/0141525 A1 | 6/2011 | Ng et al. |

FOREIGN PATENT DOCUMENTS

EP    1 401 189    3/2004

*Primary Examiner* — Thomas D Lee
*Assistant Examiner* — Stephen M Brinich
(74) *Attorney, Agent, or Firm* — RatnerPrestia

(57) ABSTRACT

A method of halftoning a continuous-tone image includes the step of expressing a transition tone intensity by a maximum population density of halftone dots equal in size and having a transition dot size. Expressing tone intensities darker than the transition tone intensity includes increasing dot sizes beyond the transition dot size of the maximum population. Expressing tone intensities lighter than the transition tone intensity includes using a population density lesser than the maximum population density, and each relatively darker tone includes a relatively smaller dot size and a relatively larger population density than each relatively lighter tone.

29 Claims, 14 Drawing Sheets

500

500

600

METHODS AND APPARATUS FOR HALFTONING CONTINUOUS-TONE IMAGES

FIELD OF THE INVENTION

The present invention relates to systems and methods of rendering an image in which an image is expressed on a substrate through populations of very fine ink dots which alter in size and/or frequency.

BACKGROUND OF THE INVENTION

Flexographic printing is one of the fastest growing conventional printing processes, with significant commercial application in the packaging and publishing industries.

Flexography involves the transfer of an image from an inked relief plate onto a substrate. The areas on the inked relief plate which contact the substrate, and thereby transfer image characteristics, are known as the "image areas." Conversely, the "nonimage areas" on the inked relief plate do not contact the substrate. Generally, the image can be transferred to any type of substrate including, without limitation, plastics (such as polyethylene, polyester, and polypropylene), metallic films, cellophane, fabrics, and paper.

Flexographic processes encompass both line art processes and continuous-tone art processes. In line art processes, the image contains only solid black and solid white areas, and does not contain any transitional or "gray" areas. Continuous-tone art processes, by contrast, employ different artistic "tones," i.e., combinations of light and dark values, to represent a rendered object with transitions between solid black and solid white. Thus, in continuous-tone art processes, black, white, and the various shades of gray in between can be used to express the image.

Generally, continuous-tone art processes involve two steps. First, a scanner or other digitizing device digitizes the subject image. Next, a predetermined algorithm converts the digitized image into halftone dots. These halftone dots, which make up the image areas in the inked relief plate, are varied in size and/or frequency in order to produce the desired tone.

Transfer of the desired image is accomplished by direct contact between the inked relief plate and the substrate. Because of this direct contact, it becomes impractical to represent tones having a lower intensity (i.e., lighter tones) using halftone dots below a certain minimum threshold size. This is because dots below a certain minimum threshold size will not reach the printing surface.

In view of the minimum size limitation for halftone dots, a number of screening techniques are known in the art. These screening techniques include Frequency Modulation ("FM tone modulation"), which involves varying the population or density of halftone dots to express different tones, and Amplitude Modulation ("AM tone modulation"), which involves varying the size of dots to express different tones. Specifically, FM tone modulation employs halftone dots of fixed size and a population (or distribution density) that varies depending on the desired tone. Halftone dots are arranged in pseudo-random fashion on the FM screen grid. In AM tone modulation, spacing of the halftone dots is geometric and fixed. The dots will vary in size depending on the tone represented.

These known screening techniques suffer from several limitations. In FM modulation techniques, single halftone dots become more isolated. This undesirably both increases the printing pressure on the dispersed dots and increases the size of the inked plate relief. Further, in some cases, the transferred image may become distorted as smaller dots no longer reach the substrate. To offset this effect, larger dots are typically used in FM modulation than in AM modulation. This results in "grainy" images, tonal jumps, and discontinuous digital dot gains.

Likewise, AM modulation may not adequately represent image regions having low tonal intensities. This is especially the case where a relief pattern forms the image and non-image areas on the inked relief plate. Here, the very small halftone dots consist of small shapes, which can easily bend, break off, or otherwise distort during the image transfer. The minimum threshold size for halftone dots in AM modulation significantly limits the highlight tonal range.

Known transitional screening processes that mix characteristics of AM and FM modulation do not obviate all of the above identified deficiencies. In one such process, AM modulation may be used above a given population density (known as the transition point). Below the transition point, lighter tones are represented through FM modulation using a low dot frequency. Because of the slight population, greater pressure is applied to each dot during the printing process. This pressure may cause individual halftone dots to break, bend, or otherwise distort. Additionally, some dots below the threshold minimal size may not reach the substrate, thereby failing to transfer a portion of the image. The persisting deficiencies inherent in these known processes often produce undesirable visual distortions.

Basic Flexography Concepts Illustrated

In flexographic printing, the visibility of individual dots is undesirable. The visibility of individual dots is particularly emphasized when dots are positioned on a disordered screen grid. By constraining dot size, the visibility of individual dots is reduced. Thus, dot size is preferably kept as small as possible. Additionally, by constraining the dot size for each tone, the propensity for tonal jumps is reduced. However, as described below, printing stability and the distance between dots devise certain practical limits on dot size.

Referring now to the drawings, FIG. 1 illustrates, through a prior art relief plate 100, the relationship between dot size, dot population, and relief plate depth. A printing surface 110 represents the direct contact point of the substrate with relief plate 100. Relief plate 100 contains three general regions: a solid relief region 120, a high frequency region 130, and a low frequency region 140. High frequency (AM) region 130 and low frequency (FM) region 140 are comprised of a plurality of halftone dots. High frequency region 130 contains a relatively dense population of halftone dots, and has a relatively shallow relief plate depth 135. In low frequency region 145, halftone dots are spaced further apart than high frequency region 130, which results in a relatively deeper relief plate depth 145.

Thus, as the halftone dots become more separated, the depth of the relief plate increases. As the depth of the relief plate increases, so, too, does the minimum size of the halftone dot necessary to reach printing surface 110. A halftone dot 150 is shown below the threshold minimal size, such that it will not reach printing surface 110. Relatedly, as the distance between dots increases, and as the size of the dot decreases, the pressure applied by the printing process may bend a given dot, resulting in distortion. Consequently, the relationship between dot population, relief plate depth, and dot size limits expression of the full range of tonal intensities, especially with respect to the representation of lighter tones. That is, as the population density decreases, the relief plate depth increases, and bigger dots may be needed to reach the printing surface. Because of this phenomenon, larger dots are typically used in FM modulation than in AM modulation screening techniques.

FIGS. 2-4 depict, respectively, orthogonal screen grids for AM modulation, FM modulation, and a transitional technique, all of which are well-known in the art. An AM screen grid 200, depicted by FIG. 2, is comprised of halftone dots on a fixed orthogonal grid. The increasing tone intensity from right to left is accomplished by a gradual increase in dot size in the same direction. The low intensity range shown at the far right of AM screen grid 200 is somewhat constrained, as printing stability (i.e., the propensity for dots to break, bend or otherwise distort) becomes adversely affected below a certain minimal dot size.

FM screen grid 300, shown in FIG. 3, is characterized by "grainy" low intensity tones, tonal jumps, and discontinuous dot gains.

A combination of AM and FM modulation techniques is shown in FIG. 4. Beginning at the far right side of transitional screen grid 400, the lowest tonal ranges are produced by FM modulation techniques. Because FM modulation employs larger halftone dots to achieve lighter tones, concerns regarding dot sizes below a certain threshold are obviated. Moving to the left across transitional screen grid 400, tone intensity increases are achieved, according to FM modulation, by increasing the population density. This continues until a maximum population density is reached at a transition point 410. Beyond transition point 410, additional increases in tone intensity are achieved by AM modulation.

There still exists in the art, however, a need for a halftoning process that produces an improved range of tonal intensities, thereby providing an improved representation of a continuous tone image.

SUMMARY OF THE INVENTION

Aspects of the present invention relate to methods of halftoning continuous-tone images, and flexographic printing plates for use in halftoning continuous-tone images.

In accordance with one aspect of the present invention, a method for halftoning a continuous-tone image includes: expressing a transition tone intensity using a maximum population density of halftone dots in which all of the halftone dots are equal in size and have a transition dot size; expressing tone intensities darker than the transition tone intensity using the maximum population density of halftone dots in which all of the halftone dots are equal in size and have a dot size greater than the transition dot size, wherein each relatively darker tone comprises a larger dot size than each relatively lighter tone; and expressing at least a first portion of tone intensities lighter than the transition tone using a population density lesser than the first population density, wherein each relatively darker tone comprises a relatively smaller average dot size and a relatively larger population density than each relatively lighter tone.

Another embodiment comprises a flexographic printing plate having a halftone of a continuous tone image. The continuous tone image has a plurality of tone intensities. The plate includes a plurality of halftone dots characterized by regions of the plate expressing a transition tone intensity comprising a maximum population density of halftone dots having a transition dot size. The plate also includes regions expressing tone intensities darker than the transition tone intensity comprising the maximum population density of halftone dots in which all of the halftone dots are equal in size and have a dot size greater than the transition dot size, wherein each relatively darker tone comprises a larger dot size than each relatively lighter tone. Additionally, the plate includes regions of the plate expressing at least some tone intensities lighter than the transition tone comprising a population density less than the first population density, wherein each relatively darker tone comprises a relatively smaller dot size and a relatively larger population density than each relatively lighter tone.

Another aspect of the present invention comprises a computer processor programmed to convert an image for flexographic printing, the computer process comprising programmed instructions for performing the methods disclosed herein.

Yet another aspect of the present invention comprises a computer readable media including the programmed instructions disclosed herein, which when executed by a processor, causes the processor to performs the disclosed methods.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. This emphasizes that according to common practice, the various features of the drawings are not drawn to scale unless otherwise indicated. On the contrary, the dimensions of the various features may be expanded or reduced for clarity. Included in the drawings are the following figures.

DETAILED DESCRIPTION OF THE INVENTION

Figure 1:
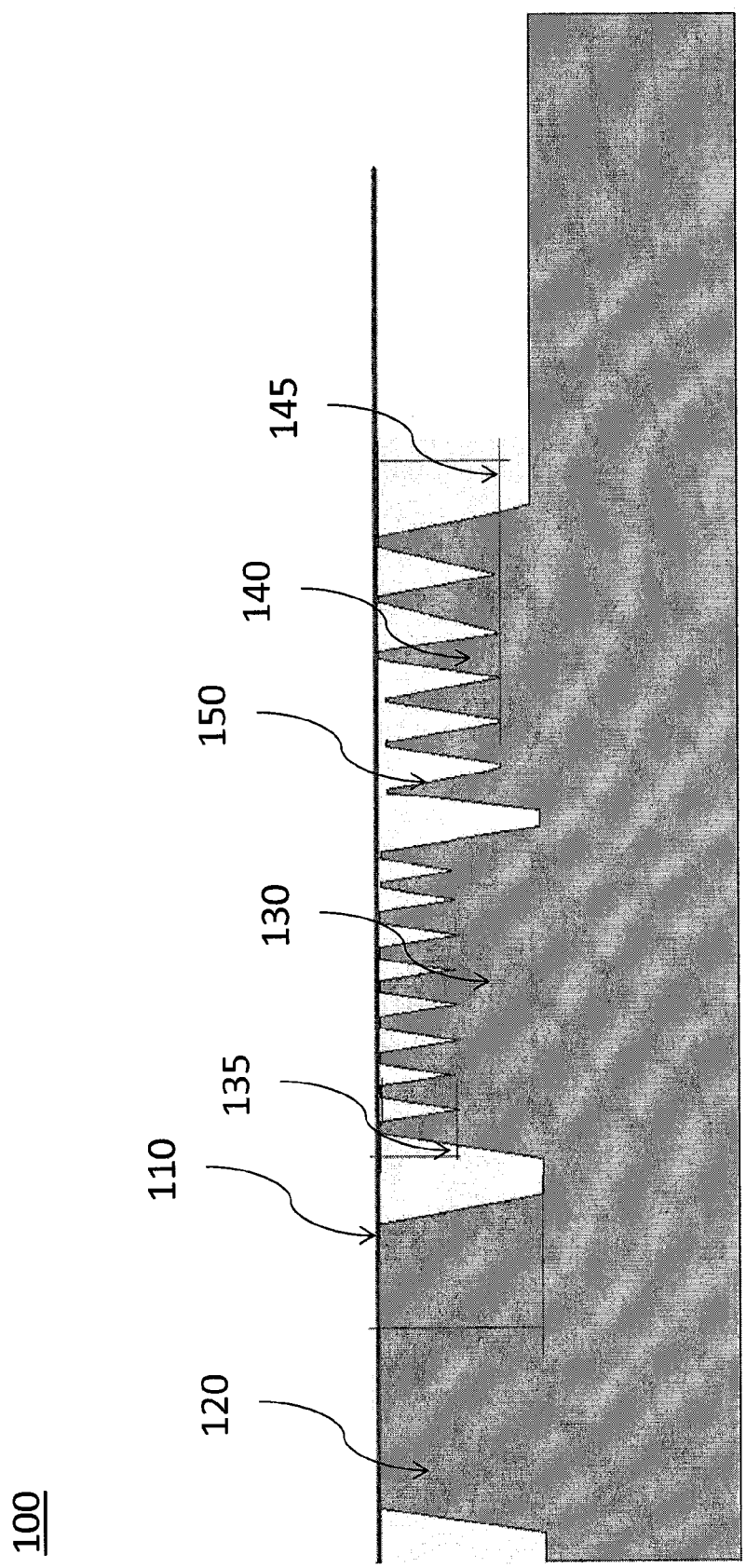
FIG. 1 is a two dimensional cross-sectional view of a relief plate according to the prior art.

The various aspects of the present invention relate generally to novel methods for halftoning a continuous-tone image. These methods entail the use of one or more groupings of halftone dots to convert a continuous-tone image into a halftone image. The one or more groupings of halftone dots have differing dot sizes and/or dot populations. Varying dot size and/or dot population permits the representation of different artistic tones. Moreover, variation of these characteristics according to the methods disclosed herein results in improved halftone images.

Many Raster Image Processors (RIPs) use single pixel threshold bitmaps to convert images. Single pixel threshold bitmaps only allow pixels to switch on past a specific threshold or tone. On these RIPs halftone dots can only increase in size for increasing tones. Thus, one embodiment of the invention creates an optimal transition for use with single threshold bitmaps. In this embodiment, tone intensity is increased by increasing the population of dots by adding new dots of a decreasingly smaller dot size. Thus, while the population of the halftone dots increases, the average halftone dot size decreases. Once the maximum printable population of dots is reached, and the average halftone dot size is at its minimum, tone intensity may be further increased by gradually increasing the average halftone dot size. Preferably, average halftone dot size is increased by increasing the size of the smaller dots at a relatively faster rate than that of the larger dots. At a certain point, corresponding to the transitional tone, all halftone dots have an equal size. Beyond the transitional tone, further increases in tone intensity may be achieved through standard AM modulation.

In RIPs that support multiple pixel threshold bitmaps, dot size can increase or decrease for increasing tone intensity. Accordingly, another embodiment of the invention is suitable for use with a multiple pixel threshold bitmap. In this embodiment, the lightest tones are represented with a relatively lower population of relatively larger dots. For increasing tones, the population of dots is gradually increased while the size of the dots is gradually decreased. The addition of dots and concomitant decrease in size continues until the standard AM screen grid is reached. After this tone, standard AM modulation is used to achieve further increases in tone intensity.

Aspects of the present invention also relate to flexographic printing plates constructed using the methods described herein. Flexographic printing plates according to the invention include multiple regions of halftone dots. One or more regions may include a transition tone intensity represented by a maximum population of dots and a transition dot size. One or more regions may include tones having darker intensities than the transition tone. In these darker regions, all of the halftone dots are equal in size, and greater in size than the transition dot size, and each relatively darker tone has a relatively larger dot size than each relatively lighter tone. Additionally, one or more regions may include tones having lighter intensities than the transition tone. These regions are characterized by a population density less than the maximum population of dots. Moreover, in these regions, each relatively darker tone comprises a relatively smaller average dot size and a relatively greater population density than each relatively lighter tone.

Other aspects of the present invention relate to a computer processor programmed to convert an image for flexographic printing. The computer processor is programmed with instructions for carrying out any of the methods recited herein. Relatedly, a computer readable media is disclosed herein which includes program instructions for execution by a processor to perform any of the methods recited herein.

The flexographic printing methods and systems described herein provide an improved halftone image. In particular, the methods and systems of the present invention increase the highlight tonal range of printed artwork. The inventive methods and systems additionally achieve lighter tones without the corresponding loss of image stability associated with prior art systems.

While the invention is described herein primarily with respect to a flexography, it will be understood that the invention is not so limited. The disclosed embodiments may be employed in connection with any printing process which represents continuous images through populations of dots. Moreover, reference by depiction or otherwise of conically-shaped dots is for explanation of the inventive concepts described here; the invention as understood by one of ordinary skill in the art includes halftone dots of all 3 dimensional geometries including, but limited to: cylindrical, pyramidal, hemispherical, cuboid, and prismatic. The inventive methods and systems are not limited to transferring images to a particular substrate. Rather, the disclosed embodiments may be used on any suitable substrate including, but not limited to: plastics (such as polyethylene, polyester, and polypropylene), metallic films, cellophane, fabrics, and paper. Additionally, while the invention is described herein primarily with respect to dark and light tones, it should be understood that the disclosed embodiments are suitable for use with black ink or inks of any color.

Embodiments for Use with Single Pixel Threshold Bitmaps

Figure 2:
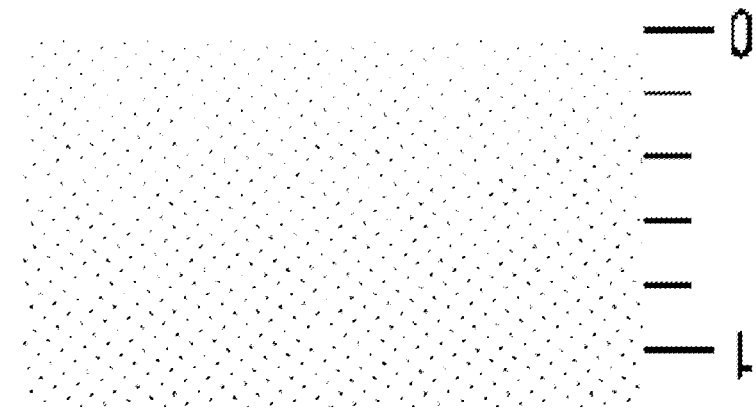
FIG. 2 is a diagram of an AM tone modulated screen grid of the prior art.
Figure 2:
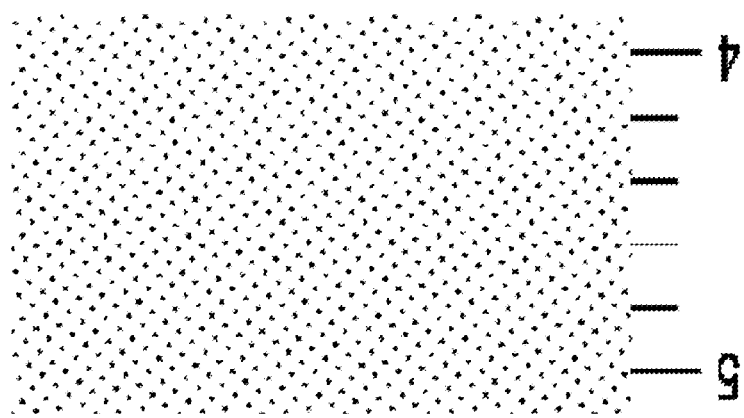
Figure 2:
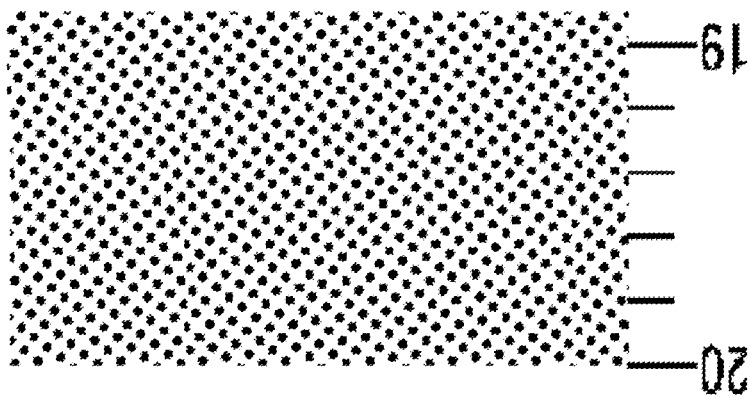
Figure 3:
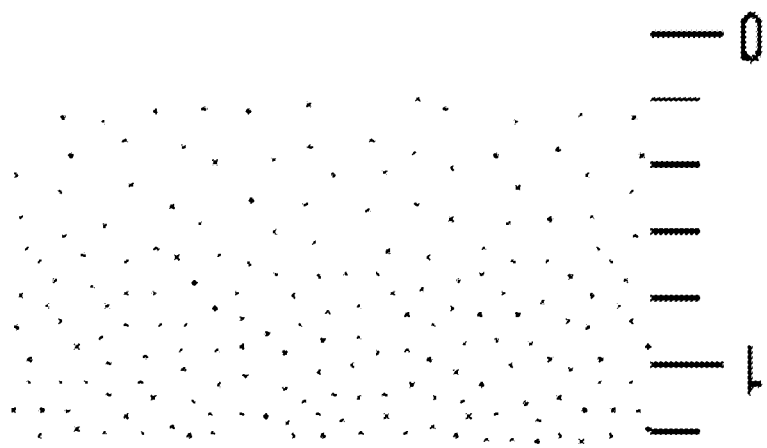
FIG. 3 is a diagram of an FM tone modulated screen grid of the prior art.
Figure 3:
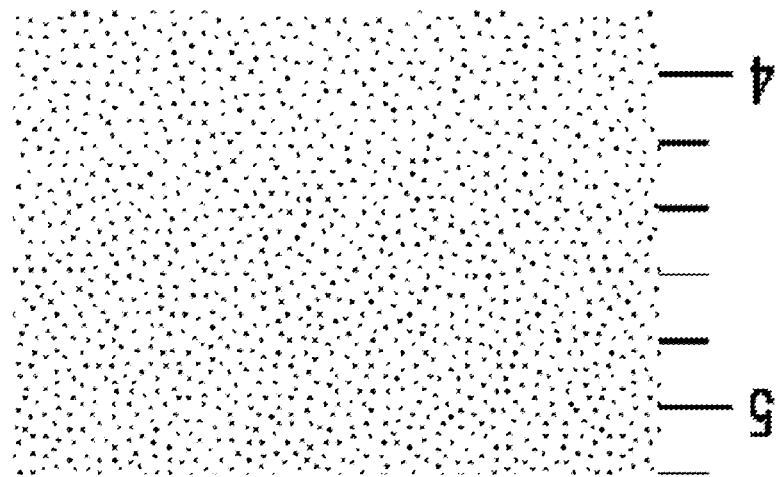
Figure 3:
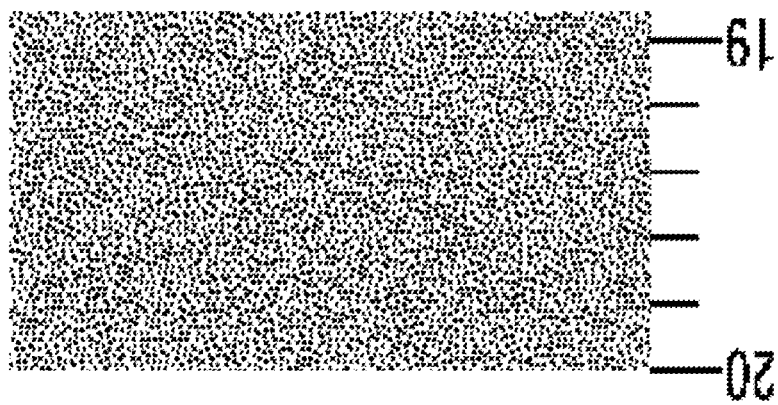
Figure 4:
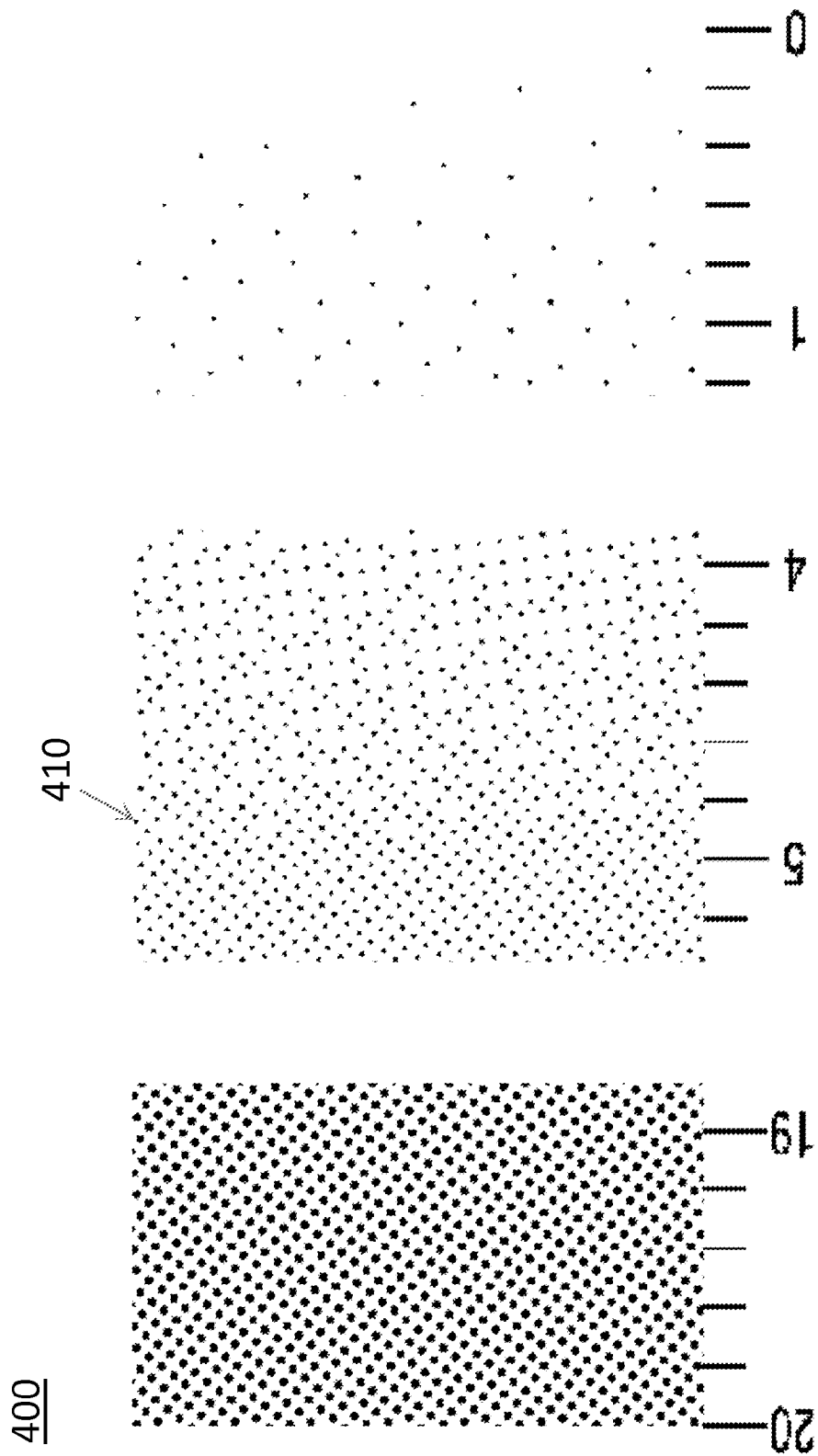
FIG. 4 is a diagram of a prior art transitional screen grid combining AM and FM tone modulation.
Figure 5A:
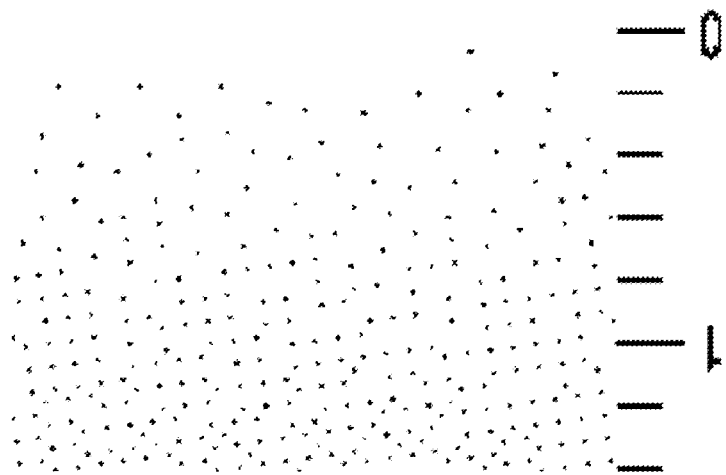
FIG. 5a is a diagram of a screen grid embodiment suitable for use with single threshold bitmaps in accordance with aspects of the present invention.
Figure 5A:
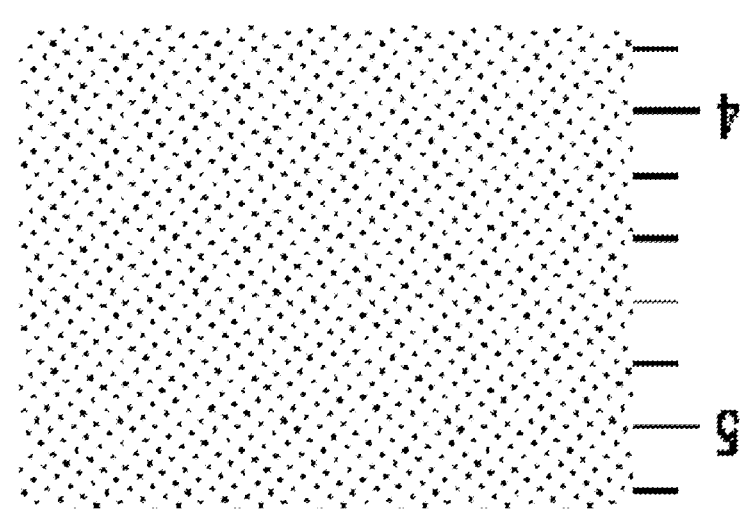
Figure 5A:
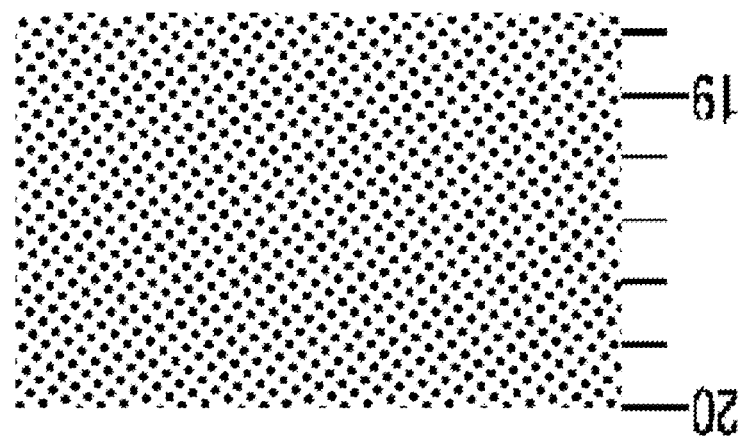
Figure 5B:
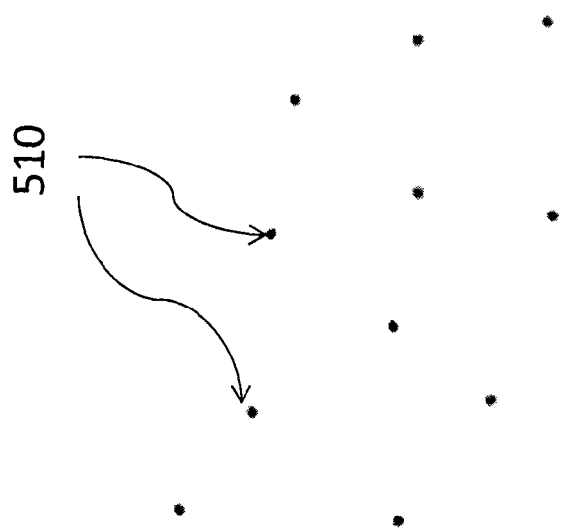
FIG. 5b is a magnified plan view of a first portion of the screen grid of FIG. 5a depicting a tone generated by a first population of dots.
Figure 5C:
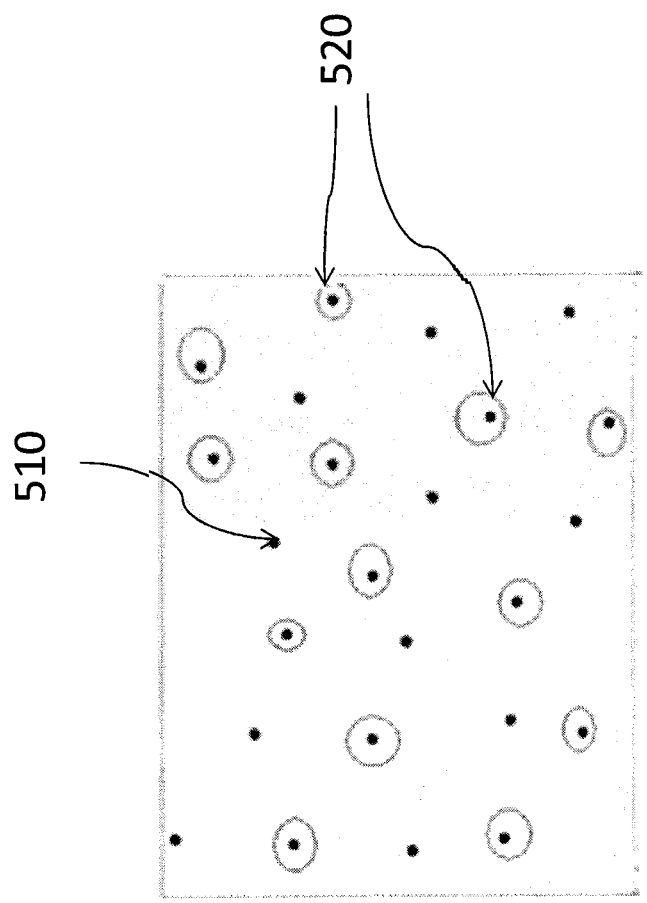
FIG. 5c is a magnified plan view of a second portion of the screen grid of FIG. 5a depicting a tone generated by a first and second population of dots.

FIGS. 5a-e depict a screen grid 500 produced using an exemplary halftoning process of the present invention, which is particularly well suited for use in systems using a single pixel threshold bitmap for image conversion. Screen grid 500 depicts a range of tonal intensities lacking the visual artifacts associated with the prior art screen grids shown in FIGS. 2-4. Beginning at the far right of screen grid 500, the lightest tones are represented by a first population 510 of relatively low density and relatively large dots. As shown in FIG. 5b, first population of dots 510 is characterized by dots separated by significant non-image space. In single pixel threshold bitmaps, individual pixels are turned on at a specific tone threshold and cannot be turned off above that threshold; thus, the dot size cannot be reduced for darker tones. Thus, darkening the tone while reducing average dot size is accomplished by the addition of a second population of dots 520, shown in FIG. 5c, that are relatively smaller than the existing first population of dots. The dots included in second population of dots 520 are positioned at the farthest distance possible from first population of dots 510 in order to prevent the appearance of clusters. As the total population of dots increases, the distance between dots decreases. This allows for the use of smaller halftone dots, in view of the relationship between dot size and dot distance described above. Additionally, by adding smaller dots, each relatively darker tone has a smaller average dot size than each relatively lighter tone.

Additional populations of dots may be added after the first and second populations. The populations of dots added during these steps may, in one embodiment, be positioned according to the AM screen grid. In another embodiment, dots are progressively moved away from the AM screen grid, as smaller dots gather closer to larger dots.

Through this process, discrete tone intensities are represented by a total population of halftone dots having different sizes.

Figure 5D:
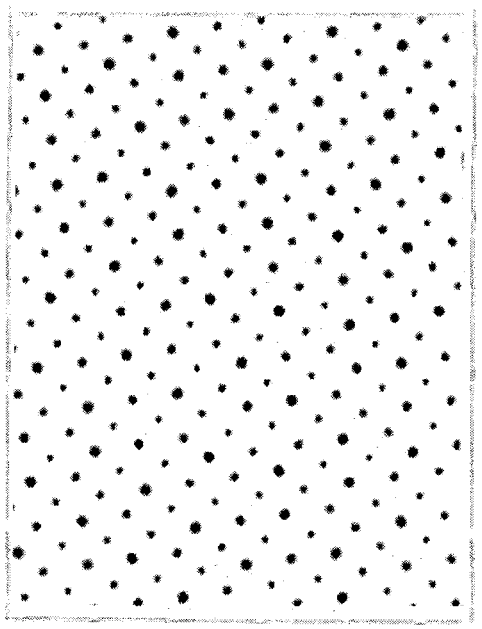
FIG. 5d is a magnified plan view of a third portion of the screen grid of FIG. 5a depicting a tone generated by a maximum population of dots.

For the next several tonal increases, additional populations of even smaller dots are added, until a maximum dot population is reached (i.e., the AM screen grid is completely filled, and the average dot size is at its lowest value). FIG. 5d depicts this maximum dot population. Preferably, the dot size added to achieve the maximum dot population is the smallest dot size that the printing environment can handle for a specified maximum dot population. The maximum dot population may also, in some embodiments, conform identically or equivalently to the spacing and positioning of the orthogonal AM screen grid.

Further darkening the tone once the maximum population is reached may be achieved by increasing the size of all or some of the dots. Preferably, the smaller dots (such as second population of dots 520) increase in size at a faster rate than the larger dots (such as first population of dots 510). Tone intensity may be adjusted by increasing the dot size of each population differently. In another embodiment, the different dot sizes may be distributed in a non-periodic and un-structured manner. A preferred embodiment involves distributing dot sizes on the screen grid using a blue noise sequence.

Figure 5E:
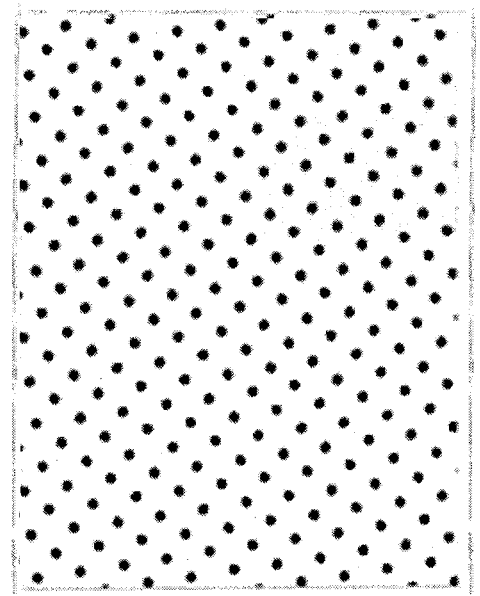
FIG. 5e is a magnified plan view of a fourth portion of the screen grid of FIG. 5a depicting an exemplary dot pattern at the transition tone.

Increasing dot size in this manner (i.e., where smaller dots increase at a faster rate than larger dots) will eventually result in all dots having an equal size. The intensity of the tone where all dots are equally sized, as depicted by FIG. 5e, is known as the transition tone intensity.

The transition tone intensity is configurable. Specifically, the intensity of transition tone intensity can be varied by altering the relative speed at which the larger and smaller dots increase in size, as well as altering dot size, including the minimum dot size and the dot size of first population of dots 510.

Further increase in tone intensity beyond the transition tone intensity may be achieved through standard AM tone modulation.

Embodiments for Use with Multiple Pixel Threshold Bitmaps

Figure 6A:
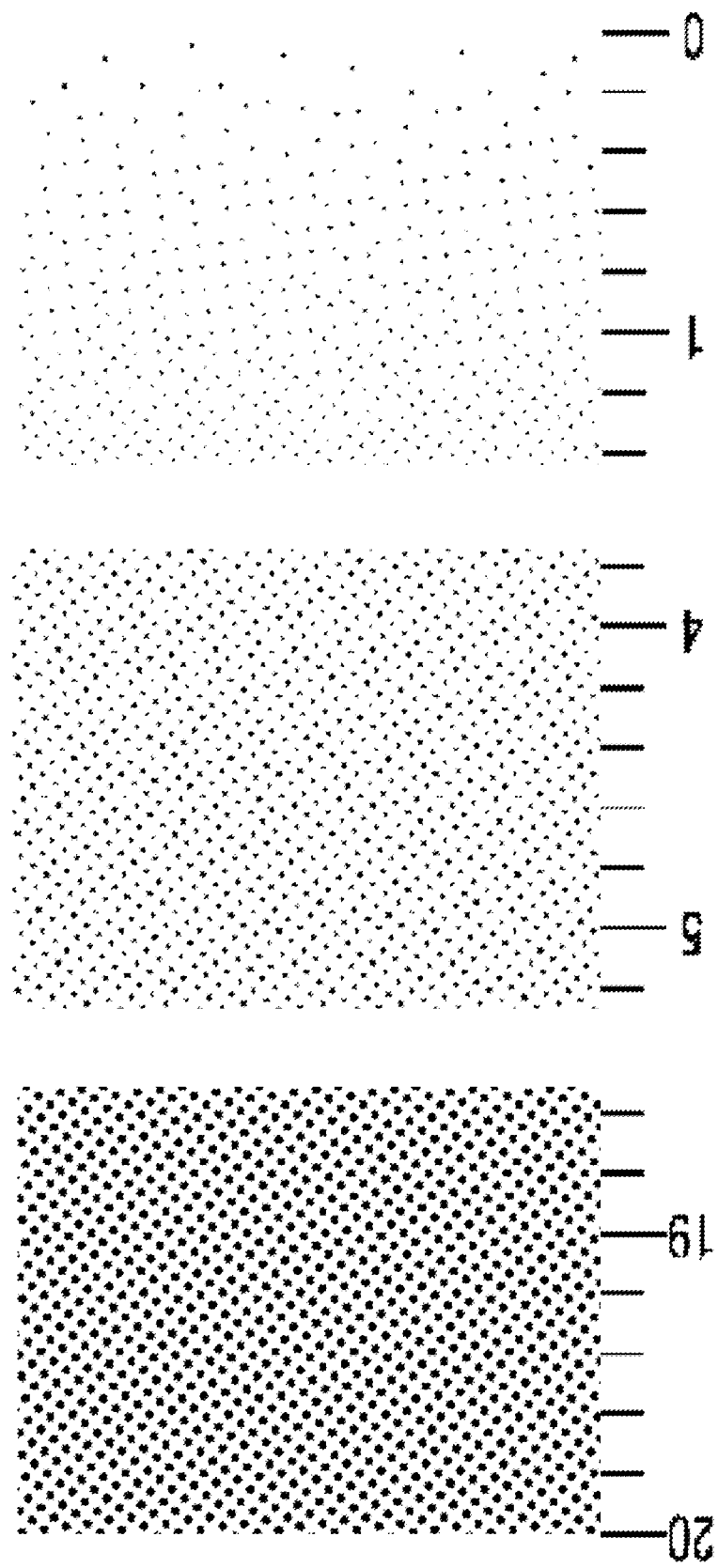
FIG. 6a is a diagram of an exemplary screen grid suitable for use with multiple threshold bitmaps in accordance with aspects of the present invention.
Figure 6B:
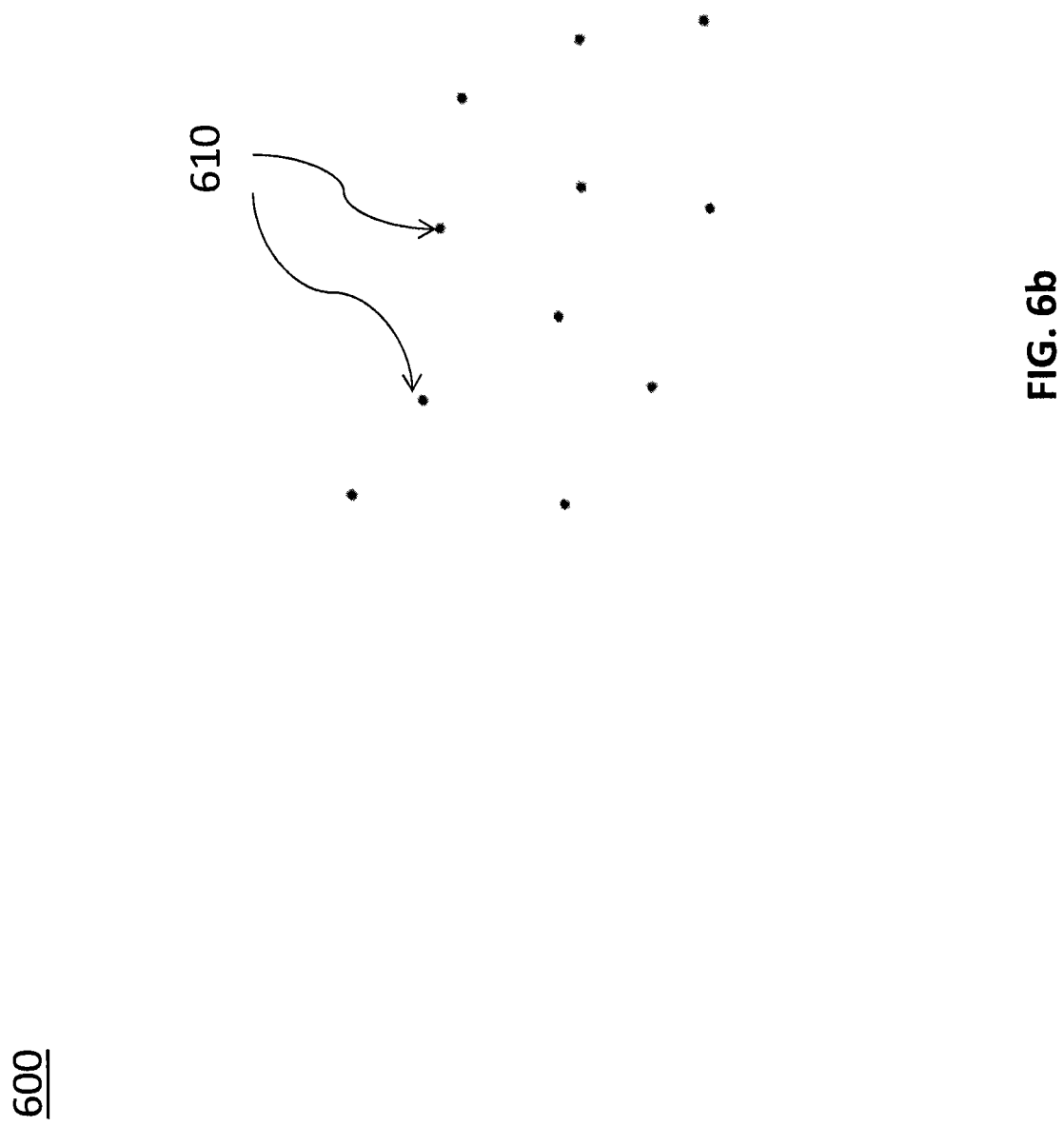
FIG. 6b is a magnified plan view of a portion of the screen grid of FIG. 6a depicting a tone generated by a first population of dots.
Figure 6C:
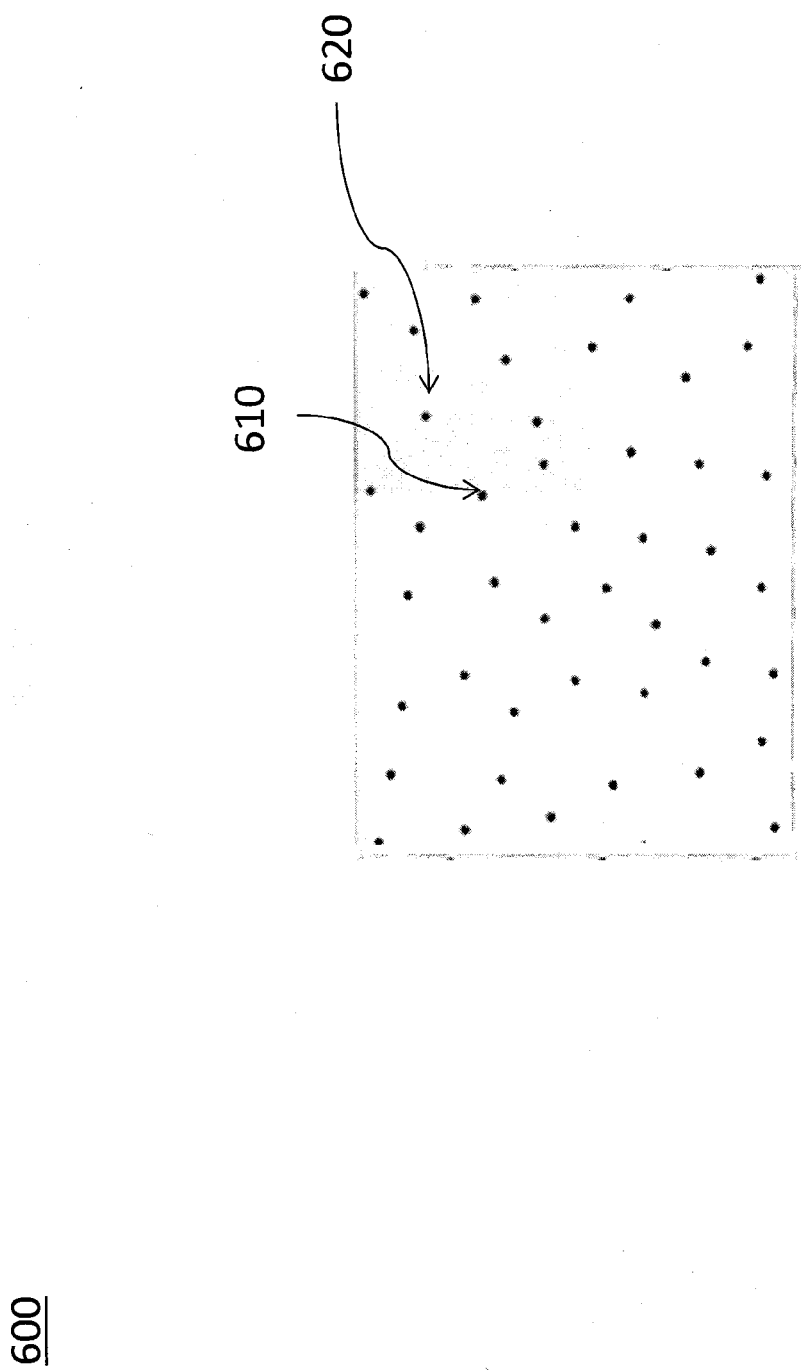
FIG. 6c is a magnified plan view of a portion of the screen grid of FIG. 6a depicting a tone generated by a first and second population of dots.

FIGS. 6a-e illustrate an exemplary screen grid 600 produced using a multiple pixel threshold bitmap to convert images in accordance with one embodiment of the invention. Similar to the embodiment described above, the lightest tones at the far right of screen grid 600 are represented by a first population 610 of relatively low density and relatively large dots. First population of dots 610 includes dots which are spaced to a maximize distance between dots, as shown in FIG. 6b. Unlike single pixel threshold bitmaps, however, multiple pixel threshold bitmaps permit individual pixels to be turned off above the initial threshold at which they are turned on, thereby permitting a reduction in dot size for darker tones. Turning to FIG. 6c, darkening the tone occurs by simultaneously adding a second population 620 of dots that are relatively smaller than existing first population of dots 610, and reducing the dot size of first population of dots 610 so that all dots 610 and 620 are the same size.

The populations of dots added during these steps may, in one embodiment, be positioned according to the AM screen grid. In another embodiment, dots are progressively moved away from the AM screen grid, as smaller dots gather closer to larger dots.

Additional populations of dots may be added beyond the first and second populations. As the total population of dots increases, the distance between dots decreases. This allows for the use of smaller halftone dots, in view of the relationship between dot size and dot distance described above. Additionally, by adding smaller dots and reducing the dot size of existing dots to the same size of the newly added smaller dots, each relatively darker tone has a smaller dot size than each relatively lighter tone. Because reducing dot size works to lighten tone intensity, and increasing population size (i.e., density) works to darken tone intensity, the desired balance between these two characteristics is preferably observed to effect a net darker tone. This balance may be effected by certain variables, including the desired type of relief plate, press, ink, and substrate.

Figure 6D:
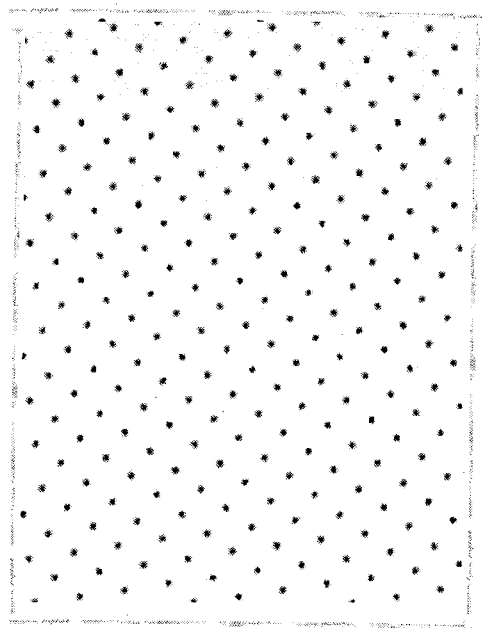
FIG. 6d is a magnified plan view of a portion of the screen grid of FIG. 6a depicting a tone generated by a maximum population of dots at the transition tone.

To achieve darker tones, additional populations of even smaller dots are added, and existing populations of dots are reduced to the same smaller size until a maximum dot population is reached, and the dot size is at its lowest value. The maximum dot population is shown in FIG. 6d. The dot size at the maximum dot population is preferably the smallest dot size that the printing environment can handle for a specified maximum dot population. The tone intensity achieved at the maximum dot population is the transition tone intensity. At the transition tone intensity, all dots are preferably equal in size, and positioned as close together as possible.

Figure 7:
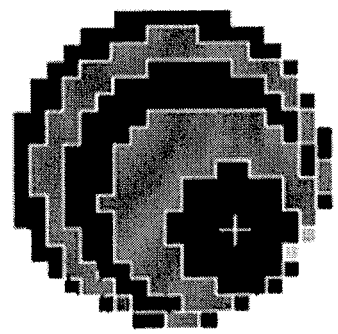
FIG. 7 is a diagram depicting the shift from a deformed grid to an orthogonal grid.

The maximum dot population at the transition tone intensity may, in some embodiments, conform identically or equivalently to the spacing and positioning of the orthogonal AM screen grid. In one embodiment, deformation of the screen grid may be desirable to avoid the appearance of "holes" as dots are removed. Under these circumstances, it may be desirable to grow the remaining dots asymmetrically in order to achieve a complete shift of the deformed grid to an orthogonal grid. This asymmetrical growth is depicted in FIG. 7.

Further increase in tone intensity beyond the transition tone intensity may be achieved through AM modulation.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for transforming a continuous-tone image, having a plurality of tone intensities, into a halftone image, the method comprising the step of:

converting, using a computer processor programmed to perform such conversion, the continuous-tone image into the halftone image, the halftone image comprising a plurality of halftone dots, wherein the converting step comprises:

expressing in the halftone image a transition tone intensity using a maximum population density of halftone dots in which all of the halftone dots are equal in size and have a transition dot size;

expressing in the halftone image tone intensities darker than the transition tone intensity using the maximum population density of halftone dots in which all of the halftone dots are equal in size and have a dot size greater than the transition dot size, wherein each relatively darker tone comprises a larger dot size than each relatively lighter tone; and expressing in the halftone image at least a first portion of tone intensities lighter than the transition tone using a population density lesser than the first population density, wherein each relatively darker tone comprises a relatively smaller average dot size and a relatively larger population density than each relatively lighter tone.

2. The method of claim 1, comprising converting the continuous tone image into the halftone image using a single pixel threshold bitmap.

3. The method of claim 2, comprising expressing in the halftone image each tone intensity in a first set of tone intensities lighter than the transition tone intensity and darker than a minimum tone intensity by providing a population of halftone dots having a plurality of dot sizes.

4. The method of claim 3, comprising expressing in the halftone image a second portion of tone intensities lighter than the transition tone and darker than the first portion using the maximum population density of halftone dots in which a first fraction of dots all have a first fraction dot size and a second fraction of dots collectively have an average dot size smaller than the first fraction dot size, wherein each relatively darker tone comprises a greater average dot size in the second fraction than each relatively lighter tone.

5. The method of claim 4, wherein expressing in the halftone image a minimum tone intensity in the first portion of tone intensities comprises providing only the first fraction of dots.

6. The method of claim 5, wherein expressing in the halftone image darker tones in the first portion of tone intensities comprises providing one or more dots of the second fraction of dots.

7. The method of claim 6, wherein for a first grouping of tone intensities in the first portion, the second fraction comprises a variable plurality of dots smaller than the first fraction dot size and all having a first grouping dot size, and for a second grouping of tone intensities darker than the first grouping, the second fraction comprises a fixed plurality of dots having the first grouping dot size and a variable plurality of dots smaller than the first grouping dot size and all having a second grouping dot size.

8. The method of claim 7, wherein expressing in the halftone image a lightest tone intensity in the second set comprises providing the maximum dot population density and a plurality of dot sizes, including one or more dots at a minimum printable dot size, positioned in an AM dot grid.

9. The method of claim 7, wherein the step of expressing tones of lesser intensity than the threshold tone intensity in the halftone image comprises positioning dots with dot centers on an AM dot grid.

10. The method of claim 7, wherein the step of expressing tones of lesser intensity than the threshold tone intensity in the halftone image comprises positioning dots with at least some dot centers not on an AM dot grid.

11. The method of claim 7, wherein the step of expressing tones of lesser intensity than the threshold tone intensity in the halftone image comprises positioning dots of different dot sizes in an non-periodic and unstructured distribution.

12. The method of claim 11, wherein the non-periodic and unstructured distribution is in accordance with a blue-noise sequence.

13. The method of claim 1, comprising converting the continuous tone image into the halftone image using a multi-threshold bitmap.

14. The method of claim 13, wherein in the halftone mage the transition tone comprises an AM grid filled with equal sized dots at a minimum printable dot size.

15. The method of claim 14, wherein for each tone intensity lighter than the transition tone in the halftone image, each tone comprises a population of halftone dots of equal size that are greater than the minimum printable dot size, and wherein expressing each relatively darker tone in the halftone image comprises using a relatively greater population density of halftone dots having a relatively smaller dot size than the population density and dot size of each relatively lighter tone.

16. A computer processor programmed to convert an image for flexographic printing, the computer programmed with instructions for carrying out the method of claim 1.

17. Non-transitory computer readable media including program instructions which when executed by a processor cause the processor to perform the method of claim 1.

18. The method of claim 1, wherein the computer processor comprises a Raster Image Processor (RIP).

19. The computer processor of claim 16, wherein the computer processor comprises a Raster Image Processor (RIP).

20. A method for creating a printing plate for printing an image represented by a continuous-tone image, the method comprising:
    converting the continuous-tone image into the halftone image in accordance with the method of claim 1;
    constructing the printing plate comprising a plurality of halftone dots corresponding to the plurality of halftone dots in the halftone image.

21. The method of claim 20, wherein the printing plate created thereby comprises a flexographic printing plate comprising a halftone of a continuous tone image comprising a plurality of tone intensities, the plate comprising a plurality of halftone dots, the plate characterized by:
    regions of the plate expressing a transition tone intensity comprising a maximum population density of halftone dots having a transition dot size;
    regions of the plate expressing tone intensities darker than the transition tone intensity comprising the maximum population density of halftone dots in which all of the halftone dots are equal in size and have a dot size greater than the transition dot size, wherein each relatively darker tone comprises a larger dot size than each relatively lighter tone and
    regions of the plate expressing at least some tone intensities lighter than the transition tone comprising a population density less than the first population density, wherein each relatively darker tone comprises a relatively smaller average dot size and a relatively larger population density than each relatively lighter tone.

22. The computer processor of claim 16, wherein the method defined by the programmed instructions comprises converting the continuous tone image into the halftone image using a single pixel threshold bitmap, and the step of converting further comprises:
    expressing in the halftone image each tone intensity in a first set of tone intensities lighter than the transition tone intensity and darker than a minimum tone intensity by providing a population of halftone dots having a plurality of dot sizes;
    expressing in the halftone image a second portion of tone intensities lighter than the transition tone and darker than the first portion using the maximum population density of halftone dots in which a first fraction of dots all have a first fraction dot size and a second fraction of dots collectively have an average dot size smaller than the first fraction dot size, wherein each relatively darker tone comprises a greater average dot size in the second fraction than each relatively lighter tone;
    wherein expressing in the halftone image a minimum tone intensity in the first portion of tone intensities comprises providing only the first fraction of dots and expressing in the halftone image darker tones in the first portion of tone intensities comprises providing one or more dots of the second fraction of dots; and wherein for a first grouping of tone intensities in the first portion, the second fraction comprises a variable plurality of dots smaller than the first fraction dot size and all having a first grouping dot size, and for a second grouping of tone intensities darker than the first grouping, the second fraction comprises a fixed plurality of dots having the first grouping dot size and a variable plurality of dots smaller than the first grouping dot size and all having a second grouping dot size.

23. The computer processor of claim 16, wherein the method defined by the programmed instructions comprises converting the continuous tone image into the halftone image using a multi-threshold bitmap, wherein in the halftone image the transition tone comprises an AM grid filled with equal sized dots at a minimum printable dot size, and wherein for each tone intensity lighter than the transition tone in the halftone image, each tone comprises a population of halftone dots of equal size that are greater than the minimum printable dot size, in which the converting step further comprises:
 expressing each relatively darker tone in the halftone image using a relatively greater population density of halftone dots having a relatively smaller dot size than the population density and dot size of each relatively lighter tone.

24. A flexographic printing plate comprising a halftone of a continuous tone image comprising a plurality of tone intensities, the plate comprising a plurality of halftone dots characterized by:
 regions of the plate expressing a transition tone intensity comprising a maximum population density of halftone dots having a transition dot size;
 regions of the plate expressing tone intensities darker than the transition tone intensity comprising the maximum population density of halftone dots in which all of the halftone dots are equal in size and have a dot size greater than the transition dot size, wherein each relatively darker tone comprises a larger dot size than each relatively lighter tone and
 regions of the plate expressing at least some tone intensities lighter than the transition tone comprising a population density less than the first population density, wherein each relatively darker tone comprises a relatively smaller average dot size and a relatively larger population density than each relatively lighter tone.

25. The flexographic printing plate of claim 24, wherein all regions of the plate expressing tone intensities lighter than the transition tone intensity and darker than a minimum tone intensity comprise a population of halftone dots having a plurality of dot sizes.

26. The flexographic printing plate of claim 24, wherein regions of the plate expressing tone intensities lighter than the transition tone comprise a population of halftone dots of equal size that are greater than a minimum printable dot size, in which regions expressing relatively darker tones comprise a relatively greater population density and relatively smaller dot size than the population density and dot size of each relatively lighter tone.

27. Non-transitory computer readable media having stored thereon a halftone image of a continuous tone image comprising a plurality of tone intensities, the halftone image suitable for processing by a processor to make a flexographic printing plate therefrom, the halftone image comprising a plurality of halftone dots, the halftone image characterized by:
 regions of the halftone image expressing a transition tone intensity comprising a maximum population density of halftone dots having a transition dot size;
 regions of the halftone image expressing tone intensities darker than the transition tone intensity comprising the maximum population density of halftone dots in which all of the halftone dots are equal in size and have a dot size greater than the transition dot size, wherein each relatively darker tone comprises a larger dot size than each relatively lighter tone; and
 regions of the halftone image expressing at least some tone intensities lighter than the transition tone comprising a population density less than the first population density, wherein each relatively darker tone comprises a relatively smaller average dot size and a relatively larger population density than each relatively lighter tone.

28. The non-transitory computer readable media of claim 27, wherein all regions of the halftone image expressing tone intensities lighter than the transition tone intensity and darker than a minimum tone intensity comprise a population of halftone dots having a plurality of dot sizes.

29. The non-transitory computer readable media of claim 27, wherein regions of the halftone image expressing tone intensities lighter than the transition tone comprise a population of halftone dots of equal size that are greater than a minimum printable dot size, in which regions expressing relatively darker tones comprise a relatively greater population density and relatively smaller dot size than the population density and dot size of each relatively lighter tone.

* * * * *